Dec. 29, 1931.  E. J. KEARNEY  1,838,555

FLUID CIRCULATING SYSTEM FOR MACHINE TOOLS

Filed Aug. 24, 1927

INVENTOR
Edward J Kearney
BY
Fred G Parsons
ATTORNEY

Patented Dec. 29, 1931

1,838,555

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

FLUID CIRCULATING SYSTEM FOR MACHINE TOOLS

Application filed August 24, 1927. Serial No. 215,047.

This invention relates to fluid circulating systems for machine tools.

It is a purpose of the invention to provide such a system in a permanent structural combination with the machine but in which parts subject to wear or adjustment are particularly accessible and may be conveniently removed and replaced in a minimum time.

Another purpose is generally to improve and simplify the construction and operation of machine tool fluid systems.

The invention consists of the particular arrangement and construction herein illustrated and described together with such modifications thereof as may be equivalent to the structure claimed.

In the drawings, like characters indicate the same parts.

Figures 1, 2, 3:
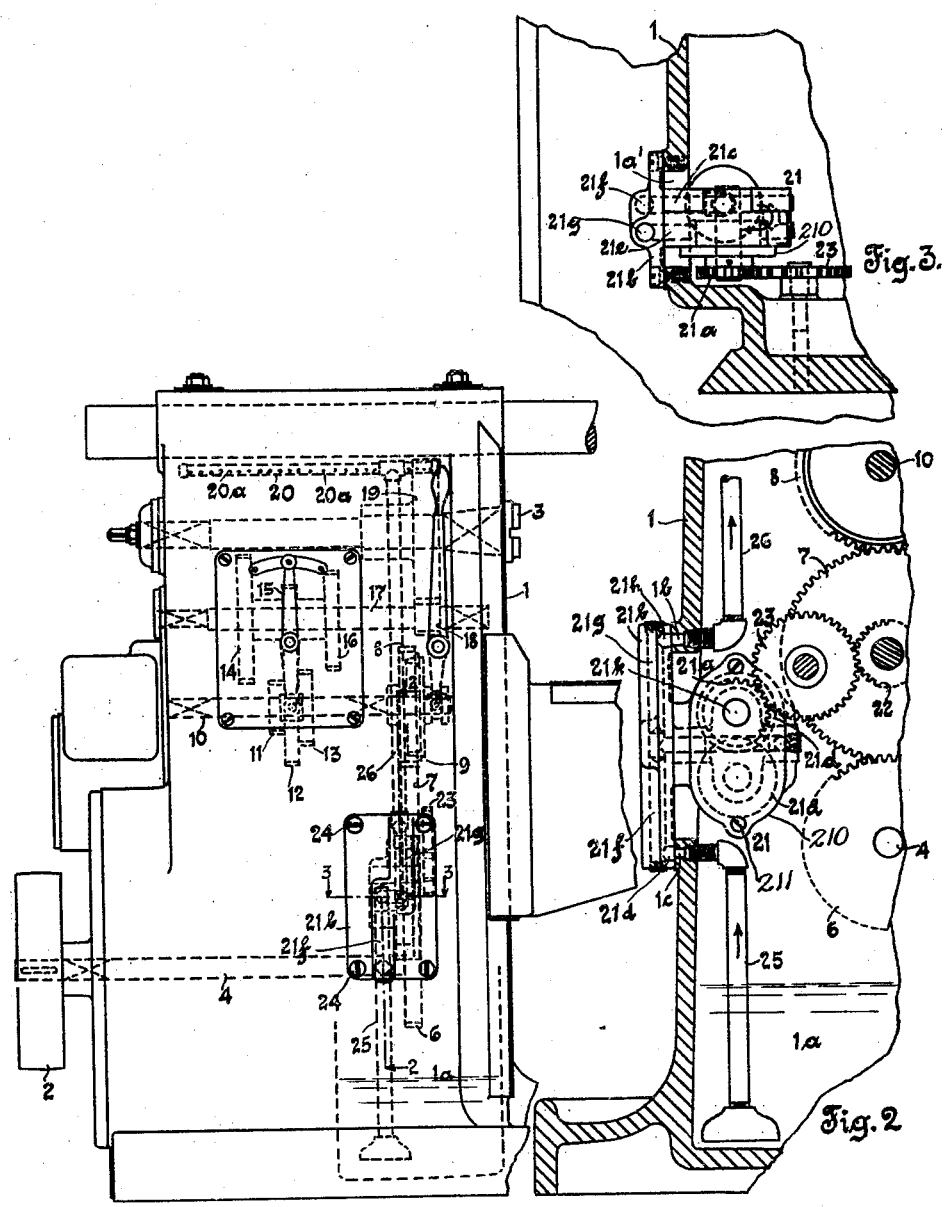
Fig. 1 is a partial side elevation of a machine tool in which the invention is incorporated.
Fig. 2 is a fragmentary view of the same machine partially in section along line 2—2 of Fig. 1 and enlarged.
Fig. 3 is a fragmentary section along line 3—3 of Fig. 1 and enlarged.

A hollow column 1 rotatably supports a tool spindle 3, a drive pulley 2, and transmission mechanism located within the hollow column including a shaft 4 upon which the drive pulley is fixed, gearing 6, 7, 8, a clutch generally denoted by the numeral 9 and operative between gear 8 and a shaft 10, rate change gears operative between shaft 10 and a shaft 17 including gear 11, 12, 13, shiftable one at a time into engagement with complementary gears 14, 15, 16, and a gear pair 18 and 19 between shaft 17 and spindle 3. Such mechanism represents one of many well known forms of spindle transmission.

The base of the hollow column provides a reservoir 1a for containing fluid, and means are provided for elevating such fluid from the reservoir to a header 20 positioned inside the hollow column at a relatively high level above the spindle and gearing, upon which the fluid is sprayed by the means of openings 20a, whence after lubricating the parts it returns to the reservoir through the hollow column to be used again. The elevating means includes a pump generally denoted by the numeral 21 and having gears 21d rotatably meshed within a housing having an inlet port passage 21c and an outlet port passage 21e (Fig. 3) the ports being arranged with relation to the gears in the usual manner for geared pumps. The shaft 21k of one of the pump gears, has a gear 21a fixed thereon and driven from a gear 22, fixed to rotate with gear 7, through an idler gear 23 rotatably supported from the column. The column is provided with an opening 1a' in a side wall thereof through which the pump may project in a position for gear 21a to mesh with gear 23, and the metal surrounding such opening is surfaced to provide a seat for a plate 21b upon which the pump 21 is fixed, the pump body being in this instance integral therewith, the plate being removably retained and located to position the pump as described, by the means of screws 24. A removable cover plate 210, Figs. 2–3, fastened by screws such as 211 provides access to the pump gears when the pump is removed from the column, and being positioned within the hollow column need not be closely fitted, since any leakage returns to the reservoir. A suction pipe 25 projects downwardly into the fluid in reservoir 1a and communicates with a channel portion 1c in the column by the means of suitable fittings as shown in Fig. 2. Channel portion 1c is in registry with a channel portion 21d in plate 21b when the plate is in the position described and a channel 21f communicates therefrom to the pump inlet passage 21c. From the pump outlet passage 21e, a passage 21g communicates with a channel portion 21h in registry, when the plate is in position, with a channel portion 1b in the column and communicating with header 20 by the means of a pipe 26 and suitable fittings as shown in Figs. 1 and 2. By the construction described the pump may be removed and replaced for inspection or repairs merely by removing or replacing the plate 21b thereby simultaneously disconnecting or connecting the fluid channels and also the driving train of the pump.

What is claimed is:

1. In a machine tool having a hollow column forming a fluid reservoir and a spindle rotatably supported from said column, the combination of a transmission train for said spindle within said column, an outlet adapted to deliver lubricant for said transmission, a pump including a casing removably attached to said column and having a pumping chamber in part formed by a removable cover plate within said column, a pump drive member supported from said casing to engage said transmission, said member being disengageable from said transmission simultaneously with the removal of said casing, and a fluid channel connecting from said reservoir to said outlet through said casing and through said chamber, said channel including registering portions respectively in said column and in said casing.

2. In a machine tool having a hollow column forming a fluid reservoir, and a spindle rotatably supported from said column, the combination of a transmission train for said spindle including a shaft within said column, an outlet adapted to deliver lubricant to said transmission, a pump including a casing removably attached to said column and having a pumping chamber in part formed by a removable cover plate within said hollow column, said pump having a drive shaft within said column and parallel with the first mentioned shaft, gearing connecting said shafts and disconnectible simultaneously with the removal of said casing, and a closed fluid channel connecting said reservoir and said outlet through said chamber, said channel including registering portions in said casing and in said column and disengageable simultaneously with the removal of said casing.

In witness whereof I hereto affix my signature.

EDWARD J. KEARNEY.